(12) United States Patent
Strause et al.

(10) Patent No.: US 6,359,228 B1
(45) Date of Patent: Mar. 19, 2002

(54) SPLICE CLOSURE

(75) Inventors: Kevin L. Strause, Keller; Kelly J. Smith, Aledo; Christopher L. Holderness, Pflugerville, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/495,062

(22) Filed: Jan. 31, 2000

(51) Int. Cl.[7] ............................. H01R 4/00; H02G 7/14
(52) U.S. Cl. .................... 174/91; 174/92; 174/41
(58) Field of Search ................ 176/92, 93, 77 R, 176/41, 40

(56) References Cited

U.S. PATENT DOCUMENTS

| | | | | |
|---|---|---|---|---|
| 4,704,499 A | * | 11/1987 | Faust | 174/92 |
| 4,810,829 A | * | 3/1989 | Rutenbeck et al. | 174/41 |
| 4,831,215 A | * | 5/1989 | Clark et al. | 174/92 |
| 4,839,471 A | * | 6/1989 | Clark et al. | 174/92 |
| 4,857,672 A | | 8/1989 | Rebers et al. | 174/93 |
| 4,972,167 A | * | 11/1990 | Fujioka | 336/92 |
| 5,247,135 A | | 9/1993 | Rebers et al. | 174/92 |
| 5,322,973 A | | 6/1994 | Dagan | 174/92 |
| 5,382,756 A | * | 1/1995 | Dagan | 174/92 |
| 5,479,553 A | | 12/1995 | Daems et al. | 385/135 |
| 5,525,756 A | | 6/1996 | Mullaney et al. | 174/92 |
| 5,561,268 A | * | 10/1996 | Dagan et al. | 174/92 |

* cited by examiner

Primary Examiner—Dean A. Reichard
Assistant Examiner—William H. Mayo, III

(57) ABSTRACT

A closure arrangement for cable splice assemblies having two hinged cover members. The cover members are independently hingedly secured to a central spine. The spine, in turn, is affixed to a portion of the frame of the splice assembly. In operation, the cover members are opened outwardly to expose virtually all of the outer portion of the internal splice components. In the described embodiment, the cover members are secured to one another by clasp or buckle-type closures that engage complimentary tabs.

16 Claims, 4 Drawing Sheets

Fig. 5 (Prior Art)
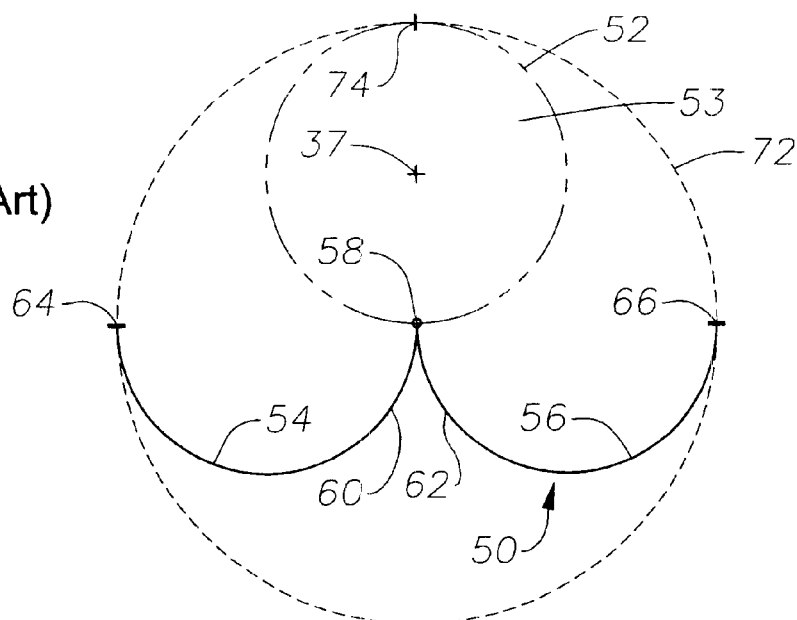
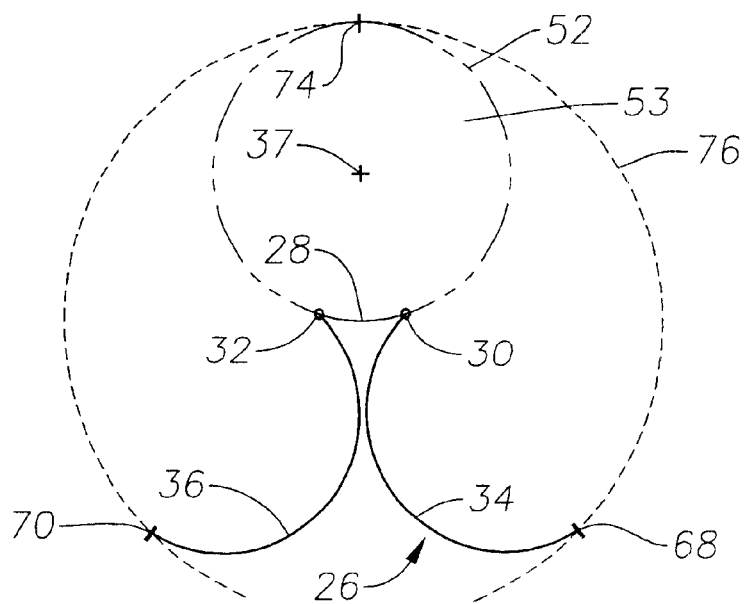
Fig. 6

SPLICE CLOSURE

BACKGROUND OF THE INVENTION

The present invention is directed to closures for cable splice assemblies.

Lengths of telecommunication cables are joined using cable splice assemblies. A cable splice is generally elongated and generally cylindrical in shape. When the communication system is fiber optic based, the splice assemblies usually incorporate a slack storage compartment for placement of extra lengths of optic fibers, at least one splice tray for making splice connections, splice organizing areas and related components.

Splices may be disposed below ground, but are most often placed in aerial locations where suspended cables are joined by the splices. A popular type of splice is the in-line splice. An in-line splice has a pair of end caps with cabling and bracketing disposed therebetween. The internal components of the splice point are delicate and need to be enclosed. Therefore, an outer cover or closure is used to protect the vulnerable splice components from weather, animals and other hazards. It is also desirable for part of the closure to be openable in order to allow selective access to the splice components by workers and the like.

There are a number of devices known for protecting splices for aerial cables from weather and the like. Unfortunately, when opened, the casings or closures for these splice assemblies do not provide optimal access to the splice components disposed within. For example, U.S. Pat. No. 4,857,672 describes a splice closure arrangement having an outer casing formed of a relatively hard plastic or metal that is openable along a seam for access to the interior. A pair of latches along the seam provide for secure closure. The top half of the casing is affixed by hanger members to a support cable, and the casing has a hinge along its length that permits the lower half of the casing to be swung away from the top half when the casing is opened. Similar outer casings are described in U.S. Pat. Nos. 5,479,553 and 5,525,756. This type of arrangement provides only a limited degree of access to the interior components since only one half of the splice assembly components become exposed. This arrangement also does not effectively expose the outer portions of the internal components, particularly if some of the internal components are actually affixed to one of the casing halves. To provide access to such components, one may need to disconnect the components from the casing half.

Resilient plastic domes are also known that are removably affixed over one end of a splice assembly. However, when removed, the dome becomes a loose piece that can be lost or misplaced. In addition, if these loose parts are accidently dropped by a worker from the height of the splice location, they may be damaged or injure someone below.

SUMMARY OF THE INVENTION

The present invention provides a novel and advantageous closure arrangement for splice assemblies. An exemplary cable splice assembly is described having a closure that has a pair of openable cover members. Each of the two cover members is independently hingedly secured to a central spine. The spine, in turn, is affixed to a portion of the frame of the splice assembly. In operation, the cover members are opened outwardly to expose virtually all of the outer portion of the frame and other internal splice components. In the described embodiment, the cover members are secured to one another by clasp or buckle-type closures that engage complimentary tabs.

The closure assembly of the present invention is advantageous in that it permits a greater degree of access to the frame of the splice assembly and the components associated therewith. The fact that there are two cover members allows opposing sides of the frame to be exposed. Also, a greater angular dimension of exposure of the frame is possible because the two portions are capable of opening away from the frame in opposing directions.

BRIEF DESCRIPTION OF THE DRAWINGS

FIG. 5 is a schematic end view of an exemplary closure cover of the prior art depicted in an open position.

FIG. 6 is a schematic end view of an exemplary closure cover of the present invention depicted in an open position.

DETAILED DESCRIPTION OF THE INVENTION

Figure 1:
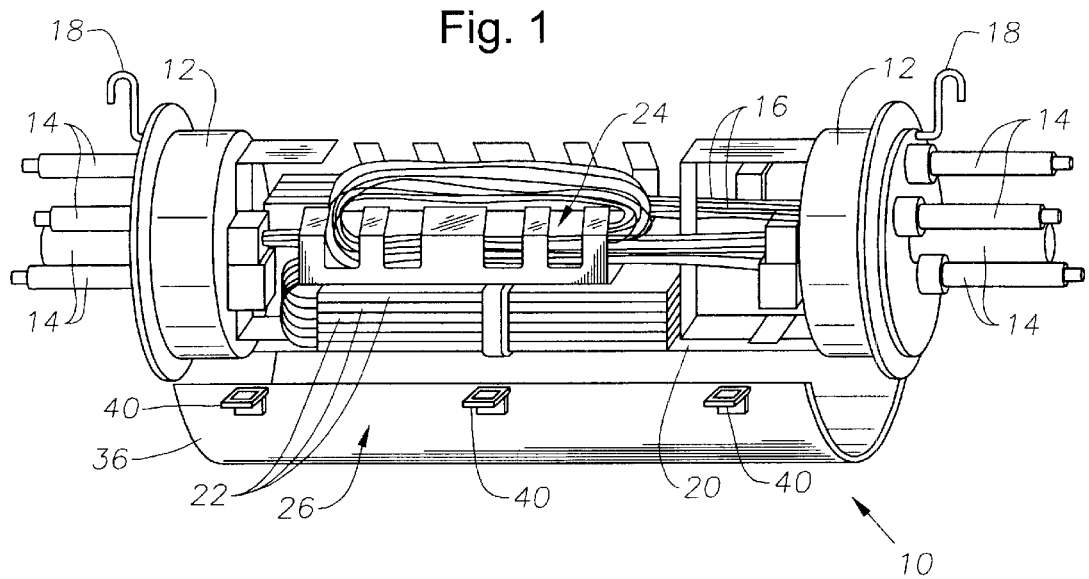
FIG. 1 is an isometric view of an exemplary optic fiber cable splice assembly constructed in accordance with the present invention.

FIG. 1 depicts an exemplary optic fiber cable splice assembly 10 constructed in accordance with the present invention. The splice assembly 10 includes a pair of generally cylindrical end caps 12 of a type known in the art for retaining optic fiber cables 14 that enter the splice assembly 10. The cables 14 have an outer insulation that contains a number of buffer tubes that house and protect a number of individual optic fibers 16. After the cables 14 are disposed through the end caps 12 and into the splice assembly 10, the outer insulation and buffer tube material is removed so that individual optic fibers 16 are exposed between the end caps 12.

It is noted that the end caps 12 may each have a hanger 18 affixed to the upper portion thereof. As will be understood by those of skill in the art, the splice assembly 10 is normally hung by the hangers 18 from a suspension wire (not shown).

The interior portion of the cable splice assembly 10 also includes a frame 20 that supports a number of splice trays 22 and a slack storage compartment shown generally at 24. The frame 20 may include brackets, bars or other structural members that are used to mount or retain optic fibers 16 and related components. There may also be a splice organizing area (not shown) disposed upon the frame 20 or other components that are known in the art for creating and/or maintaining optic fiber splices between the fibers 16. It should be noted that there may be numerous modifications of the interior components. As the invention is not intended to be limited to any particular layout of interior components, these are not described in any further detail here.

Figure 2:
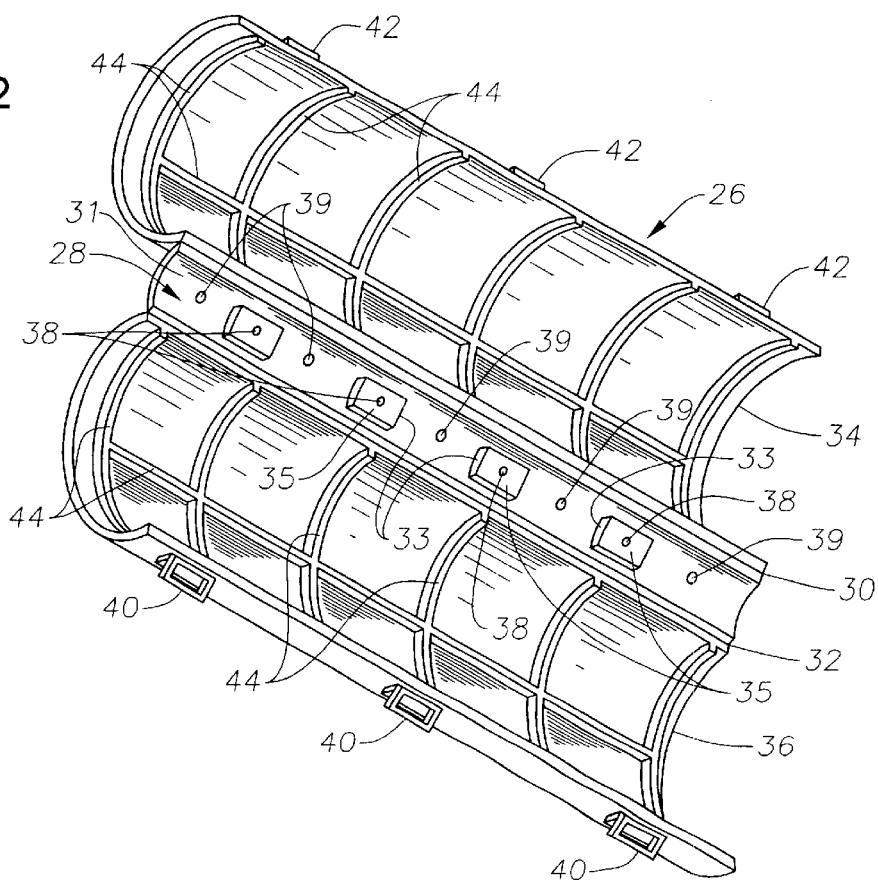
FIG. 2 depicts an exemplary cover used with the assembly of FIG. 1 apart from the assembly.
Figure 3:
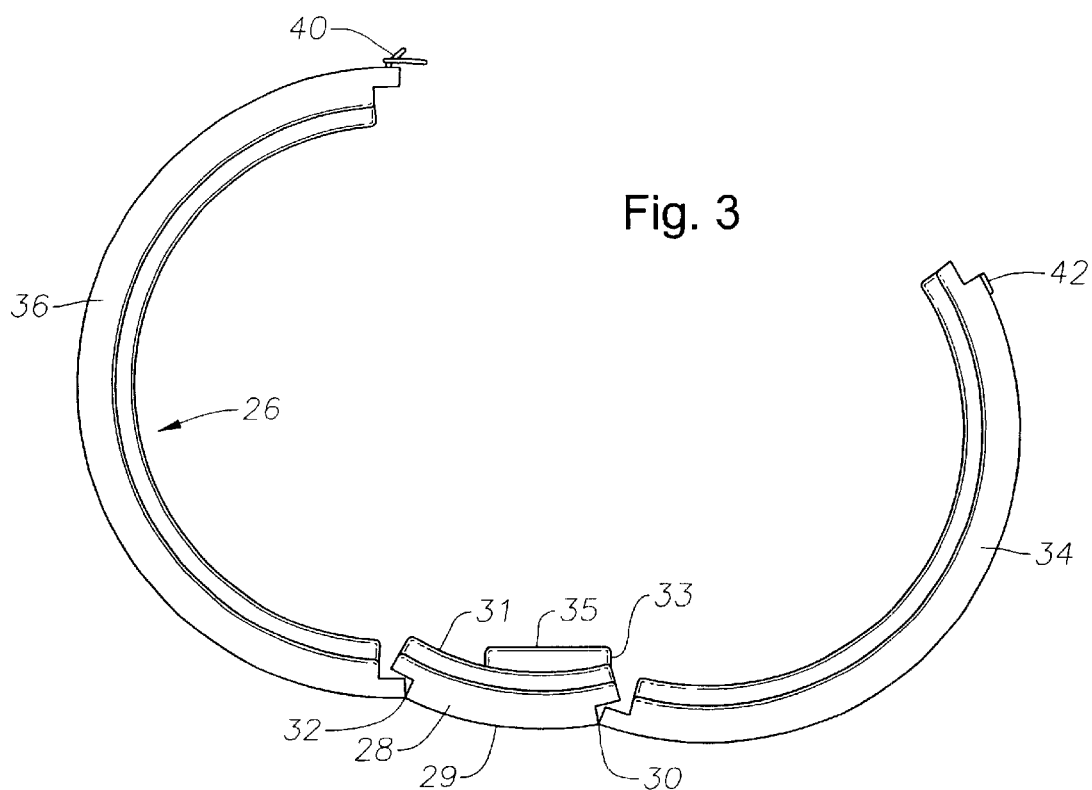
FIG. 3 is an end view of the closure cover illustrating a partially open configuration for the cover portions.
Figure 4:
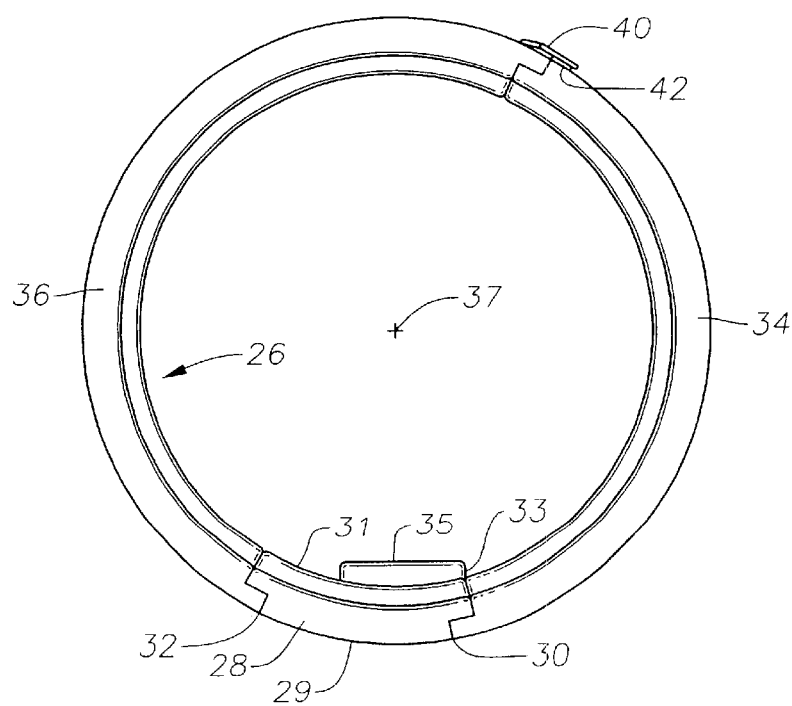
FIG. 4 is an end view of the closure cover illustrating a closed configuration for the cover portions.

The interior splice components are protected by a cylindrical closure cover 26 that is shown apart from the splice assembly 10 in FIGS. 2, 3 and 4. The cover 26 includes a central spine 28 that is a segment of a cylinder, having curved inner and outer sides. Two hinge points 30, 32 are used to hingedly affix a pair of arcuate cover members 34, 36, respectively, to the spine 28. Hinges 30, 32 are parallel to each other and to a longitudinal axis 37 of cover 26

(shown in FIG. 4). The width of the spine 28 from hinge 30 to hinge 32 may vary. Preferably, a radial line from axis 37 intersecting hinge 30 will be spaced in a range from about 25° to 40° from a radial line intersecting hinge 32. Hinges 30, 32 may be integral "living" type hinges with cover 26 or they may be separate members that are interconnected with one another in the manner of a pintle-type hinge of the sort that is commonly used with door hinges.

The spine 28 has an outer curved surface 29 and an inner curved surface 31. A number of raised portions 33 project upwardly from the inner surface 31 and provide substantially flat mounting surfaces 35, which are best shown in FIGS. 3 and 4. Each of the mounting surfaces 35 contains an aperture 38, illustrated in FIG. 2. When assembled, the spine 28 is affixed to the frame 20 of the splice assembly 10 by a connector (not shown) that is disposed through portions of the frame 20 and into each aperture 38 to secure a portion of the frame 20 directly onto each mounting surface 35. While a number of mounting surfaces are illustrated, more or fewer, including a single mounting surface that extends a substantial length of the spine 28, may be provided. The mounting surfaces 35 are illustrated in FIGS. 2, 3 and 4 to be oriented toward one side of the spine 28. However, the mounting surfaces 35 can be mounted anywhere along the spine 28 that provides sufficient support to the frame 20, including in the middle. Additionally, one or more drain holes 39 are disposed through the spine 28 to permit water that may enter the cover 26 to drain therefrom. The configuration of mounting surfaces 35 (or a single, elongated surface) on spine 28 should allow any water entering the closure to flow to the drain hole 39.

Figure 2A:
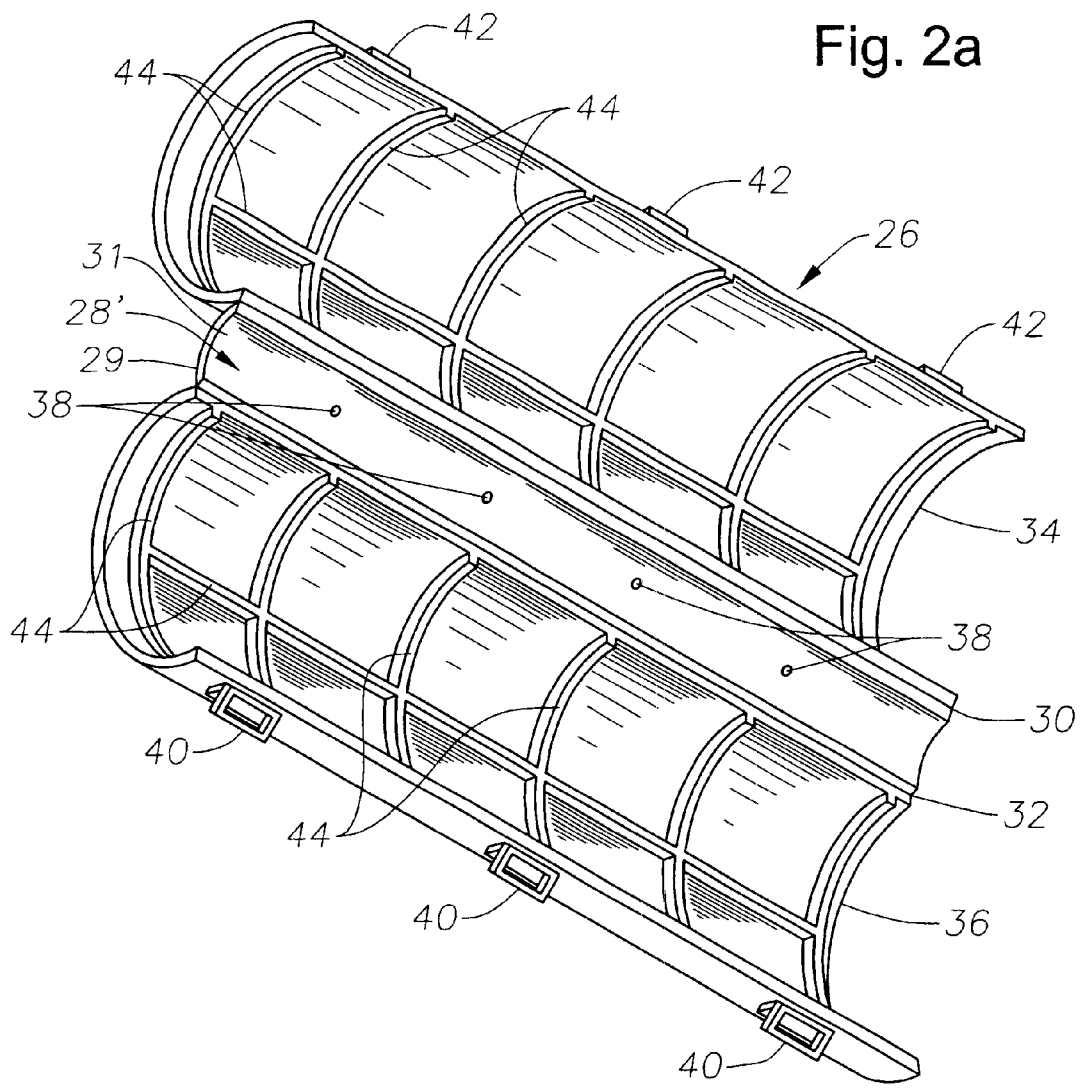
FIG. 2a illustrates an alternative embodiment for a cover used with the assembly of FIG. 1.

In an alternative construction for the cover 26, shown in FIG. 2a, the spine 28' has outer and inner curved surfaces 29, 31 but lacks the raised portion 33. The spine 28' contains a number of apertures 38, that are disposed through the spine 28' and through which connectors such as screws may be disposed. The latter type of spine 28' would be desirable where the cover 26 must be affixed to a portion of a frame 20 that is curved. Although not depicted in FIG. 2a, it should be understood that there may be drain holes formed into the spine 28' as well.

Preferably, three buckle or clasp-type securing members 40 are mounted upon one of the cover members 34, 36. The securing members 40 are shaped, sized, and located to engage and become secured with complimentary tabs 42 that are mounted on the other cover member 34, 36.

The closure cover 26 is preferably double-walled for added protection, and may be formed by blow-molding. It will be understood, however, that other methods for forming the closure cover 26 may be used as well. As illustrated in FIG. 2, as well as FIG. 2a, there are preferably a number of raised ribs 44 inside of each cover member 34, 36 that lend structural strength to the closure cover 26. However, other forms of structural strengthening are acceptable.

As FIGS. 3 and 4, and in particular 5 and 6, illustrate, the presence of two hinge points 30, 32 permits the cover portions 34, 36 to be opened to provide much greater access to the frame 20 and the interior components than would a cover or closure having only a single hinge point and providing a pair of semicircular arcs. Because two cover members 34, 36 are used, the frame 20 and related components may be exposed at two opposite sides. In addition, because the two cover portions open outwardly away from one another, there is a much greater degree of angular exposure for the frame 20 and related components. When cover members 34, 36 swing fully open, the angular distance from the free edge of one cover member to the free edge of the other cover member is approximately 260°.

Referring now to FIGS. 3 and 4, the cover members 34, 36 are shown in a partially open position (FIG. 3) and a closed position (FIG. 4). FIG. 4 shows a clasp fastener 40 on the cover member 34 engaged and interlocked with the tab 42 on cover member 36, thereby securing the cover members 34, 36 to one another.

FIGS. 5 and 6 are end-on cross-sectional schematic diagrams that illustrate the operational differences between the use of a prior art type of closure cover 50 (FIG. 5) and the exemplary closure cover 26 that is constructed in accordance with the present invention (FIG. 6). Each of these drawings depicts a circular border 52, shown in phantom, that is representative of the outer boundary of the area enclosed by each of the closure covers 50, 26 when the cover members of those covers are secured in a closed position. The longitudinal axis 37 of each closure cover is also depicted in FIGS. 5 and 6. It will be understood that the area 53 defined within the border 52 contain optic fibers, splice trays, and other internal cable splice components that are not shown in these drawings. The prior art closure cover 50 has two cover members 54, 56 that are affixed to one another at a single hinge point 58. The cover members 54, 56 are shown to have been rotated outwardly from one another and opened to essentially the greatest amount possible about the hinge point 58. Any further outward rotation of the cover members 54, 56 is precluded by contact between the outside surfaces 60, 62 of the cover members 54, 56 proximate the hinge point 58. It can be seen that the edges 64, 66 of the cover members 54, 56 are located at or only slightly below the level of the pivot point 58. As a result, access to internal components located at or near the lower end of the area 53 may be difficult due to the edges 64, 66 of the cover members 54, 56 tending to block full access. In practice, this blockage is fairly significant as the worker must typically be able to place tools adjacent the components and move them about. As a result, he may be required to try to remove the closure cover 50 entirely before being able to properly effect repairs.

FIG. 6 shows the inventive closure cover 26 that, as previously noted, has spine 28 and cover members 34 and 36 affixed to the spine 28 at hinge points 30 and 32. When in a substantially fully open position, as shown in FIG. 6, the cover members 34, 36 are able to be rotated away from the border 52 to a much greater degree than the cover members 54, 56 of the prior art closure cover 50. The spacing provided by the spine 28 permits this increased rotation by the cover members 34, 36. It can be seen that the edges 68, 70 of the cover members 34, 36 are located substantially below the hinge points 30, 32 thereby providing a worker increased access to internal components that are located around the lower end of the area 53. If an arc 72 (shown in broken lines in FIG. 5) were drawn through the upper end 74 of the border 52 and both edges 64, 66 of the prior art closure cover 50, it can be seen that it would cover only approximately 180 degrees of the circle. However, if such a similar arc 76 were drawn through the upper end 74 of the border 52 and both edges 68, 70 of the inventive closure cover 26, it would cover a much greater amount of the circle, such as approximately 260 degrees.

While the invention has been shown or described in only some of its forms, it should be apparent to those skilled in the art that it is not so limited, but is susceptible to various changes within departing from the scope of the invention.

What is claimed is:

1. A cable splice assembly comprising:
   a frame for carrying one or more cables, the frame having a longitudinal axis;
   an end cap affixed to the frame through which one or more cables may be disposed;
   at least one hanger affixed to the end cap adjacent an upper portion of the frame for hanging the cable splice assembly from a suspension wire; and
   a splice closure cover for selectively enclosing the frame of the cable splice assembly, the cover comprising:
      a longitudinally-extending spine affixed to the frame; and
      a pair of cover portions, each independently affixed by laterally spaced hinge points to the spine, the cover portions being openable and closeable along the hinge points such that the cover portions open downwardly to expose the frame.

2. The cable splice assembly of claim 1 further comprising a clasp fastener to affix the cover portions to one another.

3. The cable splice assembly of claim 1 wherein the closure cover is generally cylindrical when the cover members are closed.

4. The cable splice assembly of claim 1 wherein the hinge points are parallel to each other and to the longitudinal axis.

5. The cable splice assembly of claim 1 wherein the spine has curved outer and inner surfaces defining a segment of a cylinder.

6. The cable splice assembly of claim 1 wherein the spine provides a raised portion presenting a substantially flat mounting surface for mounting the frame to the cover.

7. The cable splice assembly of claim 1 wherein the spine has at least one drain hole disposed therethrough.

8. The cable splice assembly of claim 1 wherein the cables comprise optical fiber cables.

9. The cable splice assembly of claim 1 wherein the hinge points are circumferentially spaced apart from each other in the range from about 25 degrees to about 40 degrees.

10. In a cable splice assembly having a frame for carrying one or more fiber optic cables, the frame having a longitudinal axis, an end cap affixed to each end of the frame through which one or more optical cables may be disposed, at least one hanger affixed to the end cap adjacent an upper portion of the frame for hanging the cable splice assembly from a suspension wire and a plurality of splice trays, the improvement comprising:
   a cover closure for the splice assembly having a central spine adapted to be affixed to the frame of the splice assembly, and a pair of cover members, each independently affixed by parallel, spaced apart hinge points to the spine, the cover members being openable and closeable along the hinge points such that the cover members open downwardly to expose the frame; the spine and cover members defining a cylindrical closure while in a closed position, with the spine and each of the cover members having curved inner and outer surfaces that are segments of a cylinder; and
   a clasp fastener to affix the cover members to one another.

11. The improvement of claim 10 wherein the hinge points are circumferentially spaced apart from each other in the range from about 25 degrees to about 40 degrees.

12. A splice closure comprising:
   a frame defining a longitudinal axis and having an upper portion and lower portion;
   an end cap affixed to the frame through which one or more cables may be disposed;
   at least one hanger affixed to the end cap adjacent an upper portion of the frame for hanging the cable splice assembly from a suspension wire;
   a cover for selectively enclosing the frame, the cover comprising:
      a longitudinally-extending central spine affixed to the lower portion of the frame and having laterally spaced edges, the central spine having at least one drain hole disposed therethrough; and
      a pair of openable cover members, each independently affixed to hinge points provided on the laterally spaced edges of the spine such that the cover members open downwardly to expose the frame.

13. The splice closure of claim 12 wherein the central spine has at least one raised portion presenting a substantially flat mounting surface for mounting the spine to the frame.

14. A cover for a cable splice assembly having a frame defining a longitudinal axis, at least one end cap affixed to an end of the frame, and at least one hanger affixed to the end cap adjacent an upper portion of the frame for hanging the cable splice assembly from a suspension wire, the cover comprising:
   a central spine affixed to a lower portion of the frame opposite the suspension wire, the spine having curved outer and inner surfaces defining a segment of a cylinder; and
   a pair of cover members having curved outer and inner surfaces defining a segment of a cylinder, the cover members hingedly affixed to the spine by a pair of laterally spaced apart hinge points such that the cover members open downwardly to expose substantially all of the frame.

15. The cover of claim 14 wherein the central spine has at least one raised portion presenting a substantially flat mounting surface for mounting the spine to the frame.

16. The cover of claim 14 wherein the central spine has at least one drain hole disposed therethrough.

* * * * *